United States Patent
Jang et al.

(10) Patent No.: US 9,728,777 B2
(45) Date of Patent: Aug. 8, 2017

(54) METHODS FOR MASS-PRODUCING SILICON NANO POWDER AND GRAPHENE-DOPED SILICON NANO POWDER

(71) Applicants: Bor Z Jang, Centerville, OH (US); Yanbo Wang, Huber Heights, OH (US); Aruna Zhamu, Centerville, OH (US)

(72) Inventors: Bor Z Jang, Centerville, OH (US); Yanbo Wang, Huber Heights, OH (US); Aruna Zhamu, Centerville, OH (US)

(73) Assignee: Nanoteck Instruments, Inc., Dayton, OH (US)

( * ) Notice: Subject to any disclaimer, the term of this patent is extended or adjusted under 35 U.S.C. 154(b) by 447 days.

(21) Appl. No.: 13/987,450

(22) Filed: Jul. 26, 2013

(65) Prior Publication Data
US 2015/0028263 A1  Jan. 29, 2015

(51) Int. Cl.
*H01M 4/13* (2010.01)
*H01M 4/38* (2006.01)
*H01M 4/62* (2006.01)
*H01M 10/052* (2010.01)

(52) U.S. Cl.
CPC .......... *H01M 4/386* (2013.01); *H01M 4/625* (2013.01); *H01M 10/052* (2013.01)

(58) Field of Classification Search
CPC ... C01B 31/0446; C01B 31/0438; C01F 5/02; H01M 4/366
USPC ........................................ 423/448; 429/231.8
See application file for complete search history.

(56) References Cited

U.S. PATENT DOCUMENTS

| | | |
|---|---|---|
| 4,800,174 A | 1/1989 | Ishihara et al. |
| 7,341,907 B2 | 3/2008 | Li et al. |
| 7,371,666 B2 | 5/2008 | Swihart et al. |
| 7,615,206 B2 | 11/2009 | Sandhage et al. |
| 7,625,812 B2 | 12/2009 | Choi et al. |
| 7,888,271 B2 | 2/2011 | Sun et al. |
| 7,927,660 B2 | 4/2011 | Lu |
| 7,972,584 B2 | 7/2011 | Blencoe |
| 2003/0108459 A1 | 6/2003 | Wu et al. |
| 2010/0092141 A1 | 4/2010 | Li et al. |

(Continued)

FOREIGN PATENT DOCUMENTS

CN  102569756  *  7/2012  ............. B82Y 30/00

OTHER PUBLICATIONS

M.R. Scriba, C. Arendse, M. Harting, D.T. Britton, Thin Solid Films, 516 (2008) 844-846.

(Continued)

*Primary Examiner* — Khanh Tuan Nguyen

(57) ABSTRACT

Disclosed is a facile and cost effective method of producing nano silicon powder or graphene-doped silicon nano powder having a particle size smaller than 100 nm. The method comprises: (a) preparing a silicon precursor/graphene nano composite; (b) mixing the silicon precursor/graphene nano composite with a desired quantity of magnesium; (c) converting the silicon precursor to form a mixture of graphene-doped silicon and a reaction by-product through a thermal and/or chemical reduction reaction; and (d) removing the reaction by-product from the mixture to obtain graphene-doped silicon nano powder.

23 Claims, 7 Drawing Sheets

(56) References Cited

U.S. PATENT DOCUMENTS

| | | |
|---|---|---|
| 2010/0285235 A1 | 11/2010 | Kumar et al. |
| 2010/0288649 A1 | 11/2010 | Pal |
| 2011/0085960 A1 | 4/2011 | Mukasyan et al. |
| 2012/0282527 A1* | 11/2012 | Amine .................. H01M 4/366 429/231.8 |

OTHER PUBLICATIONS

Z.H. Bao, M.R. Weatherspoon, S. Shian, et al., "Chemical reduction of three-dimensional silica micro-assemblies into microporous silicon replicas," Nature, 446 (2007) 172-175.

E.K. Richman, et al "Ordered meso-porous silicon through magnesium reduction of polymer template silica thin films," Nano Letters, 8 (2008) 3075-3079.

* cited by examiner

METHODS FOR MASS-PRODUCING SILICON NANO POWDER AND GRAPHENE-DOPED SILICON NANO POWDER

FIELD OF THE INVENTION

This invention relates generally to a process for producing nano-scale silicon powders and more particularly to a process for mass-producing nano silicon powders and graphene/silicon nano-composite compositions for lithium-ion battery anode applications.

BACKGROUND

Lithium ion battery is a prime candidate energy storage device for electric vehicle (EV), renewable energy storage, and smart grid applications. Graphite materials have been widely used as an anode active material for commercial lithium ion batteries due to their relatively low cost and excellent reversibility. However, the theoretical lithium storage capacity of graphite is only 372 mAh/g (based on $LiC_6$), which can limit the total capacity and energy density of a battery cell. The emerging EV and renewable energy industries demand the availability of rechargeable batteries with a significantly higher energy density and power density than what the current Li ion battery technology can provide. Hence, this requirement has triggered considerable research efforts on the development of electrode materials with higher specific capacity, excellent rate capability, and good cycle stability for lithium ion batteries.

Several elements from Group III, IV, and V in the periodic table can form alloys with Li at certain desired voltages. Therefore, various anode materials based on such elements and some metal oxides (e.g., $SnO_2$) have been proposed for lithium ion batteries. Among these, silicon is considered the most promising one since it has the highest theoretical specific capacity (up to 4,200 mAh/g in the stoichiometric form of $Li_{4.4}Si$) and low discharge potential (i.e., high operation potential when paired with a cathode). However, the dramatic volume change (up to 380%) of Si during lithium ion alloying and de-alloying (cell charge and discharge) often leads to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsic low electric conductivity of silicon is another challenge that needs to be addressed. Thus far, many attempts have been made to improve the electrochemical performance of Si-based anode materials, which include (1) reducing particle size to the nano-scale (<100 nm), such as Si nanoparticles, nanowires, or thin film, to reduce the total strain energy, which is a driving force for crack formation in the particle; (2) depositing Si particles on a highly electron-conducting substrate; (3) dispersing Si particles in an active or non-active matrix; and (4) coating Si particles with a layer of carbon. Although some promising anodes with specific capacities in excess of 1,000 mAh/g have been reported, it remains challenging to retain such high capacities over cycling (e.g., for more than 100 cycles) without significant capacity fading.

Our research group discovered graphene, a new class of nano carbon materials, in 2002 [B. Z. Jang, et al, "Nano-scaled Graphene Plates," U.S. patent application Ser. No. 10/274,473 (Oct. 21, 2002); now U.S. Pat. No. 7,071,258 (Jul. 4, 2006)]. A single-layer graphene is composed of carbon atoms forming a 2-D hexagonal lattice through strong in-plane covalent bonds. In a multi-layer graphene, several graphene planes are weakly bonded together through van der Waals forces in the thickness-direction. Since 2002, our research group has been working to develop processes for mass-producing both single-layer and multi-layer graphene and their composites, and to investigate the applications of graphene materials in many areas. Recently, we have demonstrated that graphene sheets can serve as a supporting substrate for an anode active material, which can be a thin film coated onto a graphene surface or fine powders (e.g. nanoparticles) bonded to a graphene surface [B. Z. Jang and A. Zhuma, "Nano Graphene Platelet-Based Composite Anode Compositions for Lithium Ion Batteries," U.S. patent application Ser. No. 11/982,672 (Nov. 5, 2007) now U.S. Pat. No. 7,745,047 (Jun. 29, 2010)]. Several other research groups have also reported a similar approach of combining graphene with an anode active material (e.g., $SnO_2$, $TiO_2$, $Mn_3O_4$, $Fe_2O_3$, and $Co_3O_4$), by taking advantages of graphene's electric conductivity.

We hypothesize that, although the Si particles in a graphene-silicon hybrid material can still expand and shrink during lithiation/delithiation (Li alloying/de-alloying during cell charge/discharge), the strong but flexible graphene sheets surrounding the Si nanoparticles are capable of cushioning the stress/strain to some extent. Meanwhile, the graphene sheets ensure good electric contacts between adjacent Si particles and between Si particles and a current collector. With an ultra-high length-to-thickness aspect ratio (up to 50,000) and low thickness (e.g. just one or a few atomic layers), a very small amount of graphene is sufficient to provide the electron-conducting network. Furthermore, graphene by itself could also be a good anode active material. Therefore, graphene-silicon composites have been proposed as promising anode materials for lithium ion batteries.

However, such graphene/silicon composite anode materials were made by simply mixing silicon nanoparticles with graphene or graphene oxide, and such an approach often led to only limited improvement in electrochemical performance. In contrast to graphene-metal oxide composite anode materials in which metal oxide can be readily deposited or grown on graphene sheet surfaces, the limited success in graphene-silicon composite is due to the lack of a simple and efficient method capable of well controlling the structure and morphology of the resulting hybrid material that could deliver the aforementioned features and advantages.

Furthermore, from mass production and cost perspectives, current processes for producing nano Si powder have been time-consuming, energy-intensive, requiring the use of high-vacuum, high-temperature, and/or high-pressure production equipment. The resulting Si nano powder products have been extremely expensive and this cost issue has severely impeded the full-scale commercialization of Si nano powder materials. Hence, there exists a strong need for a more cost-effective process for producing Si nano powder in large quantities.

More significantly, current processes for producing Si/graphene hybrid materials typically entail producing Si nano particles and graphene sheets separately and then combining the two components together. Such a simple-minded approach eliminates the possibility for graphene or graphene precursor to offer the beneficial effects on the Si nano particle forming kinetics and energetics, and on the structure and morphology of the resulting hybrid materials. This is beyond and above the simple issues of the higher costs associated with the conventional processes. The present invention addresses all of these longstanding and most challenging problems in the lithium-ion battery industry.

The past research and development efforts on silicon nano materials have been focused mostly on silicon nano particles, silicon nano wires, silicon thin films, and even silicon nano tubes. Common methods used for producing silicon nano powders include plasma-enhanced chemical vapor deposition (PECVD), laser-induced pyrolysis of $SiH_4$, and hot-wire synthesis methods. These techniques require either ultra-high temperature or high power supply, and sometimes ultra-high vacuum, which lead to high fabrication costs. The following references are related to these conventional processes:

1. M. R. Scriba, C. Arendse, M. Härting, D. T. Britton, Thin Solid Films 516 (2008) 844-846.
2. Mark T. Swihart, et al., Process for producing luminescent silicon nanoparticles, U.S. Pat. No. 7,371,666 (May 13, 2008).
3. Ming Li, et al., Single wafer thermal CVD processes for hemispherical grained silicon and nano-crystalline grain-sized polysilicon, U.S. Pat. No. 7,341,907 (Mar. 11, 2008).
4. Byoung-lyong Choi, et al., Silicon nano wires, semiconductor device including the same, and method of manufacturing the silicon nano wires, U.S. Pat. No. 7,625,812 (Dec. 1, 2009).
5. Chi-Pin Lu, et al., Method of manufacturing nano-crystalline silicon dot layer, U.S. Pat. No. 7,927,660 (Apr. 19, 2011).
6. Sushil Kumar, et al., Process for the preparation of photo luminescent nanostructured silicon thin films, US Pub. No. 2010/0285235 (Nov. 11, 2010).
7. L. W. Wu, et al., Nano powder production system, US Pub. No. 2003/0108459 (Jun. 12, 2003).
8. Hai-Lin Sun, et al., Method of manufacturing silicon nano-structure, U.S. Pat. No. 7,888,271 (Feb. 15, 2011).
9. Shinichiro Ishihara, et al., Method for producing an amorphous silicon semiconductor device using a multi-chamber PECVD apparatus, U.S. Pat. No. 4,800,174 (Jan. 24, 1989).
10. Z. H. Bao, M. R. Weatherspoon, S. Shian, et al., "Chemical reduction of three-dimensional silica micro-assemblies into microporous silicon replicas," *Nature*, 446 (2007) 172-175.
11. E. K. Richman, C. B. Kang, T. Brezesinski and S. H. Tolbert, "Ordered meso-porous silicon through magnesium reduction of polymer template silica thin films," Nano Letters, 8 (2008) 3075-3079.

A promising method for reprocessing silica via magnesiothermic reduction was proposed by Bao, et al. [Ref. 10] using magnesium vapor to produce meso-porous silicon. Then, Richman et al. reported a similar study of reducing silica thin film to meso-porous silicon thin film by magnesiothermic routine [Ref. 11]. Silicon is obtained by the following reaction with Mg: $2Mg+SiO_2 \rightarrow 2\ MgO+Si$.

Magnesiothermic reduction of silica requires much lower temperatures (normally in the range of 600-800° C.) compared with the carbothermal reduction of silica (normally over 2000° C.) and thus has become a popular technique used in pure metal production. The patent publications given below provide some methods utilizing magnesiothermic reduction to produce pure metal or silicon.

U.S. Pat. No. 7,615,206 issued in 2009 to K. H. Sandhage and Z. H. Bao refers to methods for the production of shaped nanoscale-to-microscale silicon through partially or completely converting a nanoscale-to-microscal silica template by using magnesium vapor. After the reduction of silica to silicon, the original shape could be well maintained.

US Patent Publication No. US 2010/0288649 (inventor: U. B. Pal) provides a process and apparatus that allow metals, including metals having stable oxide phases and metals with variable valences, to be extracted from their respective ores via a reducing chamber by highly reactive metal (e.g. Mg). A solid oxide membrane (SOM) process is used to generate vapor of the highly reactive metal (Mg) in the electrolysis chamber.

US Patent Publication No. US 2010/0092141 (inventors: G. F. Li and F. Yaman) disclosed a method of converting silica to silicon and fabricating silicon photonic crystal fiber (PCF) using basically magnesiothermic reduction in a sealed or unsealed container.

US Patent Publication No. US 2011/0085960 (inventors: A. Mukasyan, et al.) disclosed a method for synthesis of high surface area (>100 $m^2/g$) and nano-sized (50-200 nm) silicon powder by initiation of self-sustained combustion reaction in a mixture of silicon dioxide and magnesium powders in a sealed reactor chamber under pressurized inert gas atmosphere. A specific feature of the method is rapid cooling of the product at a rate of 100 K/s to 400 K/s in the area directly behind the combustion front.

U.S. Pat. No. 7,972,584 issued to J. G. Blencoe in 2011 provides the magnesiothermic methods of producing solid silicon using magnesium gas having a purity of from 98.0 to 99.999%.

All these methods employ magnesiothermic reduction to form silicon from its precursor-silica either by Mg vapor or by Mg powder. When using Mg vapor to reduce silica, magnesium silicide could be easily formed and, hence, this process is not suitable for mass production. Using magnesium powder will add to cost of producing nano-sized silicon and the particle size of magnesium could dramatically influence the reduction results and purity, and thus is not suitable for mass production.

Herein, we present a facile and cost-effective method of mass-producing silicon nano powder and graphene-doped silicon nano powder. This method entails mixing a graphene material (e.g. pristine graphene, graphene oxide, or graphene fluoride) with nano-sized silica (or other silicon precursor) to obtain graphene-supported nano-sized silica and then reducing the graphene-supported nano-sized silicon via the magnesiothermic method to obtain graphene-doped nano-Si. The resulting nano-sized silicon has a size typically in the range of 2 nm-50 nm (more often in the range of 5-40 nm, and most often 10-20 nm). The Si nano particles can be prepared in the size range of 50-100 nm if so desired. Pure nano silicon powders could be obtained by heat treating the graphene-doped nano Si powders to remove graphene in the temperature range of 400~800° C.

SUMMARY OF THE INVENTION

This invention provides a method of producing nano silicon powder or graphene-doped silicon nano powder (also referred to as graphene-protected silicon nano powder) having a silicon particle size smaller than 100 nm (more typically smaller than 50 nm and often smaller than 10 nm). The method includes: (a) mixing a graphene material with a silicon precursor to prepare a nano composite of silicon precursor/graphene material (examples of silicon precursor are tetraethyl orthosilicate (TEOS), sodium silicate, and silica ($SiO_2$), Si-halogen compound, such as $SiCl_4$); (b) mixing the silicon precursor/graphene nano composite with a quantity of magnesium; (c) converting the silicon precursor to form a mixture of graphene-doped silicon and a reaction by-product (e.g. MgO or a magnesium-halogen compound) by a magnesiothermic reduction procedure; and (d) removing the reaction by-product from the mixture to obtain graphene-doped silicon nano powder.

The graphene material involved in this method may be selected from pristine graphene, graphene oxide (GO), reduced graphene oxide (RGO), graphene fluoride (GF), graphene bromide (GB), graphene iodide (GI), boron-doped graphene, nitrogen-doped graphene, chemically functionalized graphene, or a combination thereof. The graphene material may include a single-layer or few-layer sheet of pristine graphene, graphene oxide, reduced graphene oxide, graphene fluoride, graphene chloride, graphene bromide, graphene iodide, boron-doped graphene, nitrogen-doped graphene, chemically functionalized graphene, or a combination thereof, wherein few layer is defined as less than 10 layers that are stacked together through van der Waals forces with a typical inter-graphene spacing of approximately 0.335 nm or slightly larger.

In terms of Si nano powder production yield, pristine graphene is the best choice and graphene oxide (GO) the worst. The following summarizes the order: pristine graphene>boron-doped graphene>nitrogen-doped graphene>amine-functionalized graphene>graphene fluoride>graphene chloride>graphene bromide>graphene iodide>reduced graphene oxide (RGO)>graphene oxide (GO). The same order of preference is also observed in terms of the energy requirement for producing pure Si nano powders, with pristine graphene being the most energy efficient and GO the least. Pristine graphene requires the lowest magnesiothermic reduction reaction temperature.

The silicon precursor may be selected from a wide variety of organo-metallic molecules and inorganic molecules that contain Si element therein and that can be thermally and/or chemically converted into Si. Examples include tetraethyl orthosilicate (TEOS), sodium silicate, silica ($SiO_2$), SiO, $SiCl_4$, $SiF_4$, $SiBr_4$, and $SiI_4$, a combination thereof. Examples of the reaction by-product are MgO, $MgCl_2$, $MgF_2$, $MgBr_2$, and $MgI_2$.

In the aforementioned method, step (a) of preparing a silicon precursor/graphene nano composite may include dispersing or dissolving a silicon precursor in an acidic graphene solution to form a hybrid suspension, drying or removing a liquid component from the hybrid suspension and/or chemically or thermally converting the hybrid suspension to form the silicon precursor/graphene nano composite.

Preferably, the graphene material has a high surface area and is capable of serving a heterogeneous nucleation site for silicon or silicon precursor crystals in such a manner that step (a) of preparing a silicon precursor/graphene nano composite includes nucleation and growth of silicon precursor particles on a graphene surface. Controlling Si crystal sizes is essential to the electrochemical performance of Si as an anode active material.

In another preferred embodiment, step (a) of preparing a silicon precursor/graphene nano composite includes (i) dispersing or dissolving a silicon precursor in an acidic graphene solution to form a hybrid suspension, (ii) adding an alkaline chemical to the hybrid suspension to form a gel, and (iii) drying the gel to form the silicon precursor/graphene nano composite. The alkaline chemical may be selected from ammonia water, sodium hydroxide solution, potassium hydroxide solution, lithium hydroxide solution, or a combination thereof.

In another preferred embodiment, step (b) of mixing the silicon precursor/graphene nano composite with a quantity of magnesium includes liquid solution mixing, melt mixing, grinding, mechanical milling, air milling, or ball-milling. Further preferably, step (b) of mixing the silicon precursor/graphene nano composite with a quantity of magnesium includes coating the silicon precursor with magnesium to form magnesium-coated silicon precursor/graphene nano composite powder.

In yet another preferred embodiment, step (c) of converting the silicon precursor includes placing the magnesium-coated silicon precursor/graphene nano composite powder in a sealed chamber and purging the powder to a heating apparatus that allows the reaction between magnesium and silicon precursor to occur therein for forming a mixture of graphene-doped silicon and a reaction by-product. The heating apparatus comprises a holding chamber or a temporary holding chamber, a pulsed purging control system, a vacuum system, insulating materials, a heating element, a vacuum chamber, and a cooling system. The chamber may contain a thermally stable material selected from a stainless steel, a nickel alloy, a titanium alloy, a cobalt alloy, a superalloy, or a high-temperature or refractory alloy that will not react with magnesium at a high temperature in the range of from 500° C. to 1000° C.

In the method, step (d) of removing the reaction by-product from the mixture may comprise etching the reaction product by an acid solution. The etching solution may include an acid selected from HCl, $H_2SO_4$, HF, $HNO_3$, or a combination thereof. Preferably, the method may further comprise filtration, washing, and/or drying after step (d). The step of drying may include spray drying or fluidized bed drying. The drying process may also be selected from oven drying, vacuum drying, or vaporizing. The etching of the reaction by-product may include etching MgO in an acid-resistant container that is equipped with a mechanical stirring system.

Up to step (d), the method produces a graphene-doped silicon nano powder product. The graphene component may be selectively removed to produce a pure Si nano particle product. Thus, the above-discussed method may further comprise a heating process to purify the graphene-doped silicon nano powder or to remove graphene for forming pure silicon nano powder.

DETAILED DESCRIPTION OF PREFERRED EMBODIMENTS

As the eighth most common element in the universe, Silicon is a metalloid and a semiconductor, and crystallizes in a diamond cubic crystal structure. With its four outer electrons, it can readily donate or share these electrons with other elements to form many chemical bonding states, such as $Si_3N_4$, SiC, $SiH_4$, $SiCl_4$, $SiO_2$, $M_xSi$ (silicide, M=Li, Ti, Ni, Mg, Au, Ag, Al, Ca, Mo . . . ). The industrial production methods of pure silicon include carbonthermal reduction process, molten salt electrolysis, and Siemens process, in which silicon is reduced from various states of chemical compounds. However, all these methods are not meant to be used for production of nano silicon powder, which is preferred over large size Si for Lithium ion battery applications. Also, currently available fabrication methods for producing nano silicon, such as laser pyrolysis and chemical vapor deposition (CVD) techniques, are not suitable for mass production with low costs. Our method enables not only the production of nano-sized silicon particles but also in situ doping of a highly conductive nano material—graphene (also referred to as nano graphene platelet, NGP).

Figure 1A:
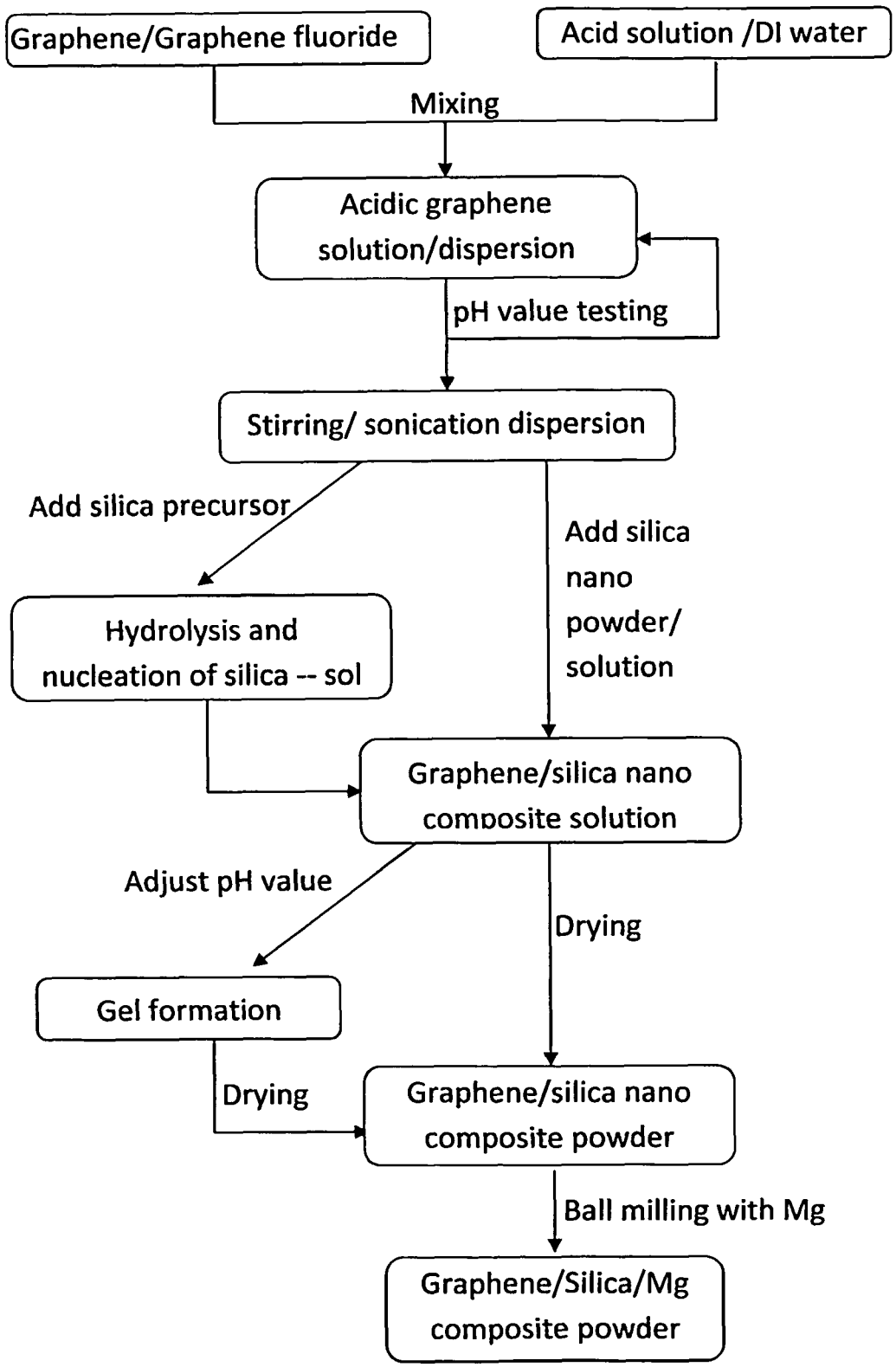
FIG. 1A flow chart showing preferred routes to prepare graphene-doped silicon nano powder and pure silicon nano powder: (a) from raw materials to graphene/silica/Mg composite powder and (b) from graphene/silica/Mg composite powder to the pure Si nano powder.
Figure 1B:
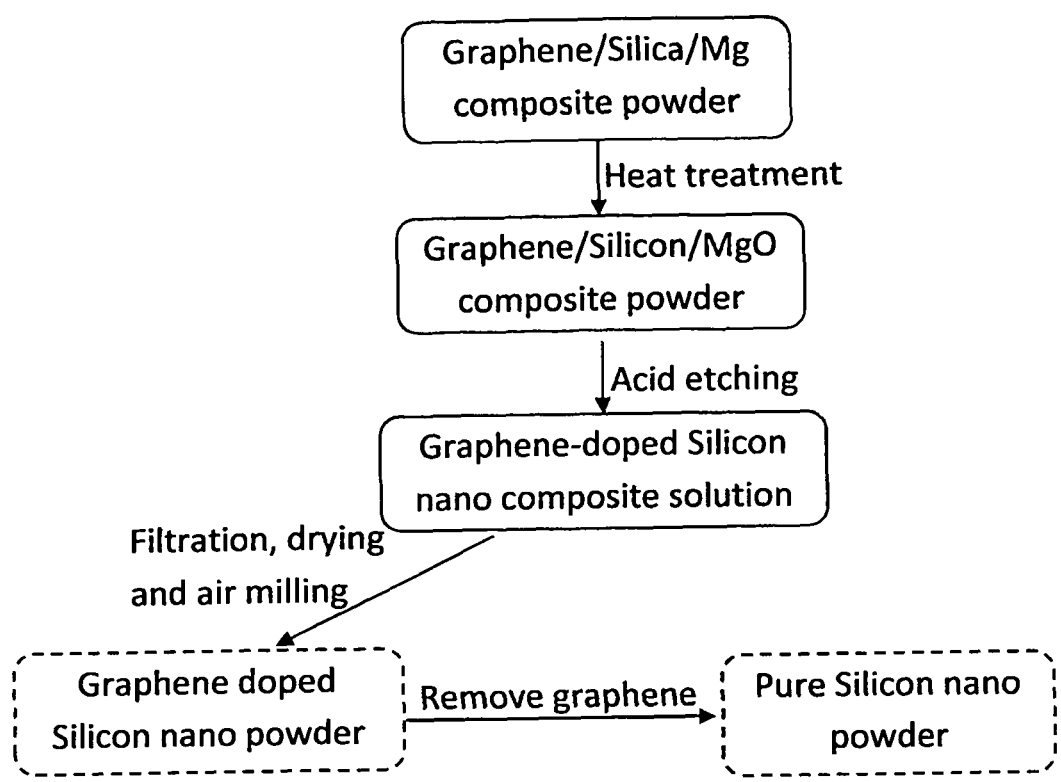

Shown in FIGS. 1(a) and 1(b), in combination, is a flow chart showing preferred routes to the preparation of graphene-doped silicon nano powder and pure silicon nano powder. FIG. 1(a) shows the procedure from raw materials to graphene/silica/Mg composite powder and FIG. 1(b) the procedure from the graphene/silica/Mg composite powder to the pure Si nano powder. As an example, one preferred embodiment of the present invention is using tetraethyl orthosilicate (TEOS) as a silicon precursor. Graphene oxide nano sheets are used as the carbon source and nucleation sites. Fundamentally, TEOS can be hydrolyzed by water both in acidic or alkali solutions. The graphene oxide (GO) solution is an acidic solution which has a pH value in the range of 1-3. This attribute makes GO naturally suitable to act as a hydrolysis media for TEOS and enables the fabrication of NGP/Silica nano composites. Before mixing TEOS with a graphene oxide solution, as shown in FIG. 1, the graphene oxide solution is diluted by DI water and further treated with ultra-sonication, shearing, or mechanical stirring to obtain a homogeneous GO dispersion or solution. The concentration of GO solution is typically and preferably maintained in the range from 0.001 wt. % to 10 wt. %, in order to achieve a low pH value. Further, HCl, $H_2SO_4$, or other acid may be needed to adjust the solution. Alternatively, acid dispersion of other types of graphene material (e.g. pristine graphene, graphene fluoride, etc) can be used to replace the GO solution.

Figure 2:
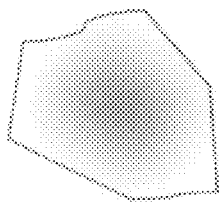
FIG. 2 Schematic procedure of Silica/Graphene preparation by sol-gel process.
Figure 2:
Figure 2:
Figure 2:
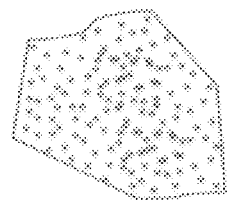

FIG. 2 illustrates the hydrolyzing mechanism of TEOS in our GO solution with a commercial name of N002-PS. The loss of 4 ethyl species in an acidic environment leads to the formation of nano-sized $Si(OH)_4$. These nano-sized particles are attached to graphene sheets and form a sol. After aging for 8~48 hours, a desired amount of ammonia water was added to the sol while being stirred, leading to the formation of a jelly like, chocolate color gel. The obtained jelly was subsequently subjected to pulverization and was heat-treated to remove water and ethanol. A fluidized bed or oven can be used for removing water or ethanol. Pulverization and drying could also be conducted at the same time using a rotary furnace with paddles.

After condensation, which is shown in FIG. 1(a), nano-sized silica particles can nucleate on every single NGP sheet, forming a silica/NGP nano composite. During the sol process, the morphologies of silica/graphene nano composites can be tailored by adding various surfactants, such as CTAB, CPC, BAC, BZT, DODAB, and Pluronic P-123. During the sol process, several types of metal powders, such as Au, Ag, Al, Ni, Cu, Ti, Co, and Sn, can be selectively added to the dispersion to obtain a metal doped silica/NGP nano composite. After reduction by Mg, these metal-doped silicon/NGP nano composites can be used as starting materials for growing silicon nano wires.

In one preferred embodiment of the present invention, the second step of the method comprises mixing the aforementioned silica/NGP nano composites (e.g. nano-sized powders, or shaped silica/graphene particles with/without pores, and metal-doped silica/NGP) with magnesium (e.g. magnesium powder or turnings). Another preferred embodiment in this step is using well dispersed nano silica suspension as a silicon precursor, with the nano silica particle size being in the range of 10 nm-100 nm. This nano silica suspension can be directly mixed with a certain ratio of nano graphene platelets and magnesium powder in a solution based regime. The mixed suspension then is subjected to a mechanical shearing or ultrasonication treatment to achieve a homogenous dispersion.

Figure 3:
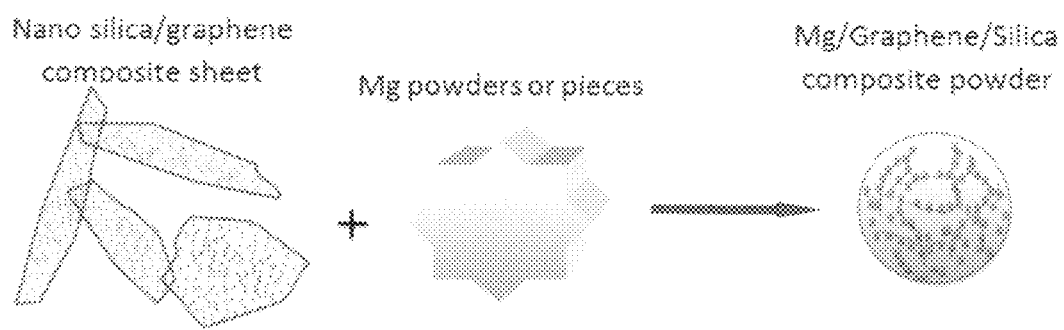
FIG. 3 Schematic procedure of Silica/Graphene/Mg preparation by ball milling.

Various graphene materials can be used to act as conductive media in the final nano silicon/NGP nano composite as well as a wrapping material to hold silica and Mg particles together. The dispersion agent may be selected from DI water, alcohol, NMP, DMAC, acetone, isopropanol etc. that do not react with Mg rapidly. Mixing Mg with silica/NGP by a dry method can be conducted with a ball mill using steel balls under an inert gas atmosphere. Mixing Mg with silica/NGP by a wet method could make use of a spray drying routine under an inert or air environment. In yet another preferred embodiment in this step, magnesium coating on silica/NGP nano composites is conducted by PVD techniques, e.g. using a sputtering system. The powders are placed in a rotating substrate or bowl. Magnesium targets are placed at inclined top, the bombardment of Ar ion makes the Mg atom sputter and deposit directly onto the surface of aforementioned silica/NGP particles. With any of these means, after this step, silica/NGP particles surrounded with Mg are obtained, as illustrated in FIG. 3 (for ball milling results).

Theoretically, in order to have a full reduction of silica to silicon, the molar ratio of Mg: $SiO_2$ should be 2:1, which means the weight ratio of Mg: $SiO_2$ should be close to 4:5. However, in some preferred embodiments, Mg content is tailored to be from 2:1~4:5. Lower Mg content would lead to insufficient reduction of silica and result in a formation of a silica core and silicon shell nanostructure. Silica core can be selectively removed by using a diluted HF solution. Alternatively, one can directly use the core-shell nano structure as an anode active material.

Homogeneous mixing of Mg with Silica/NGP leads to a more uniform reaction as compared with other methods of using magnesiothemic reduction, such as Mg vapor reduction and Mg powder reduction. In the present invention, after the second step, particles of Silica/NGP are homogenously and tightly wrapped by Mg at a desired ratio. In one preferred embodiment, as the third step of this invented method, the green powders containing Mg-wrapped silica/graphene powders are placed into a vacuum furnace. The temperature can be increased at a rate of 1° C./min to 20° C./min. In order to eliminate the absorbed moisture, an extra holding step could be carried out for several hours at 150~250° C. under vacuum. This is followed by heating the powders to a temperature range from 500° C.~800° C. and holding at this temperature for a certain period of time (typically 1-10 hours) to complete the reduction process.

Figure 4:
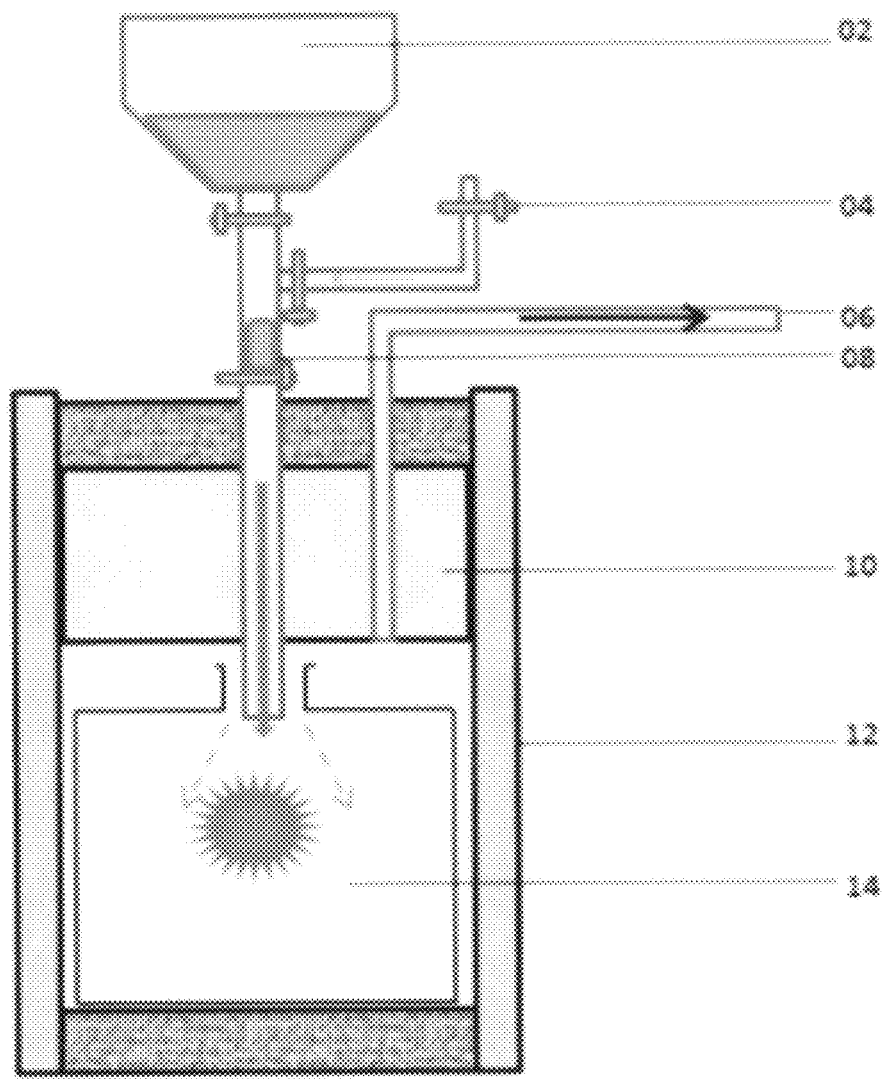
FIG. 4 Schematic of an apparatus that can be used to heat treatment of the green powders in the sixth step (02-Feed chamber; 04-pulse purging; 06-vacuum system; 08-temporary holding chamber; 10-insulating/pressure buffer device; 12-heating elements; 14-vacuum/reaction chamber).

In yet another preferred embodiment, the nano composite powders containing Silica, graphene, and Mg with/without other doping materials are placed in an apparatus shown in FIG. 4 and the powders are supplied to the chamber 14 by pulsed purging and then heat treated to a temperature in the range of 500° C.~800° C. under a vacuum condition. In some preferred embodiments, the reaction is carried out under constantly purging inert gas, which can be selected from Argon or Helium. Reaction between Mg/Silica can be fierce and exothermal and, hence, the vacuum chamber made of Mg resistant alloys must also be resistant to high pressures. This can be selected from a stainless steel, a nickel alloy, a titanium alloy, a cobalt alloy, or a super alloy. Preferably, a furnace chamber with a pressure buffer device is used for this purpose.

Figure 5:
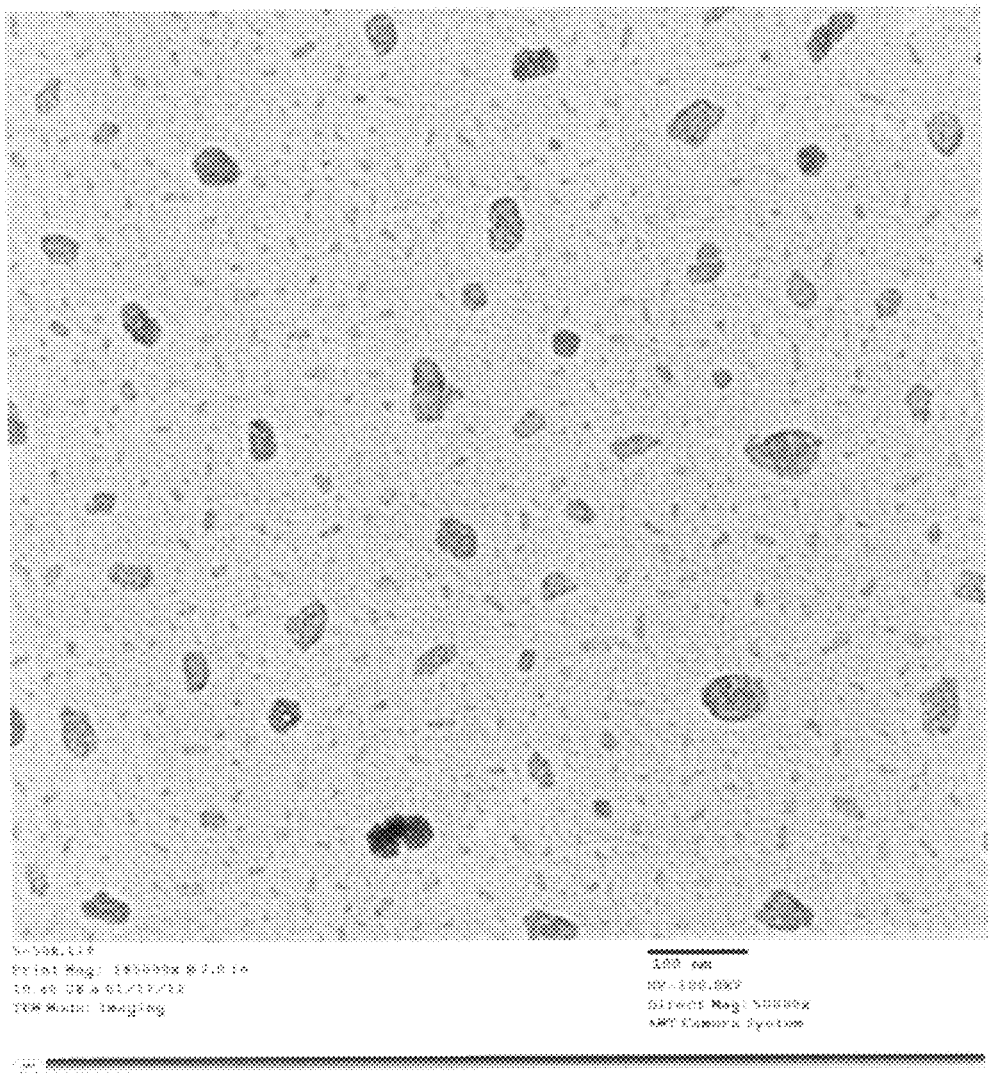
FIG. 5 Selected TEM image of the as-prepared nano silicon powders.

In the fourth step, after magnesiothemic reduction, the powder is subjected to 2M acid solution selected from HCl, $H_2SO_4$, HF, or $HNO_3$ to remove the by-product MgO through constant stirring. Generally speaking, the etching is an exothermal reaction, and a quantitative loading control and a cooling system may be needed. After leaching, the yellow solution is filtrated and washed with DI water for several times to remove other chemicals. After washing, the yellow solution contains only nano silicon/graphene powders and is dried and milled to obtain the final product. The resulted silicon nano particle typically has a size less than 100 nm, and most typically in the range of 10 nm~50 nm, as shown in FIG. 5. In an optional step in some embodiments, the final nano silicon/graphene powder is heated to a high temperature to remove graphene, leaving behind only nano silicon powders. The resulting composition, as an example, is identified and shown in FIG. 6.

The process may include a further step to convert the silicon nano particles to silicon nanowires by heat treating the etched nano powders in a furnace with a purging $Ar/H_2$ mixture at temperatures ranging from 350° C. to 1000° C., depending on the doping metal types. The metal powders may have been pre-doped in the first step of this invention with one of the following metal elements: Au, Ag, Al, Cu, Ti, Ni, Co or a combination thereof. The particle size of these preferred metals is in the range of 10 nm to ~5 µm, and when particle size is over 1 µm in diameter, a step of high energy ball milling could be carried out to reduce the diameter. In some preferred embodiments, metal salts with some anions removed may also be used in the sol-gel process. Examples include tetrabutyl titanate, nickel nitrite, and high chlorine gold acid.

Example 1

Graphene-doped Nano Silicon Fabricated from TEOS

Representative production processes include: diluting 1 wt. % N002-PS to 0.2 wt. % N002-PS by DI water, and placing the diluted PS solution to an ultrasonic bath for an ultrasonication treatment for 30 minutes. This is followed by gradually adding TEOS (0.2 wt. % N002-PS:TEOS=5:2) while stirring the PS solution. The procedure of stirring the solution is maintained for 24 hours to achieve a complete hydrolysis of TEOS. Subsequently, the procedure includes dropwise adding 10% $NH_3.H_2O$ till the formation of gel, herein referred to as the TP gel, and grinding the TP gel to tiny particles. These particles were oven-dried at 120° C. for 2 hours, at 150° C. for 4 hours. The next step involves mixing the dried TP particles with Mg at a ratio of 10:7 and ball-milling the mixture to obtain an intermediate product called TPM. Subsequently, a desired amount of TPM powders is placed in a Nickel crucible and heat treated at 680° C. Also, a certain amount of 2M HCl solution is prepared and the heat-treated TPM powders are gradually added into the acid solution, allowing the reaction to proceed for 2~24 hours and then putting the turbid liquid to an ultrasonic bath for 1 hour. The suspension was poured into the filtration system and the large particles trapped at the bottom of the system were discarded. DI water was used to rinse the filtrate three times to obtain yellow color paste, which was dried to form desired powders of graphene-doped Si nano particles. The as-prepared nano particles exhibit a specific surface area (SSA) value typically in the range of 30 to 200 $m^2/g$ for different graphene contents.

Example 2

Removal of Graphene from the Graphene-doped Si Nanocomposites

Figure 6:
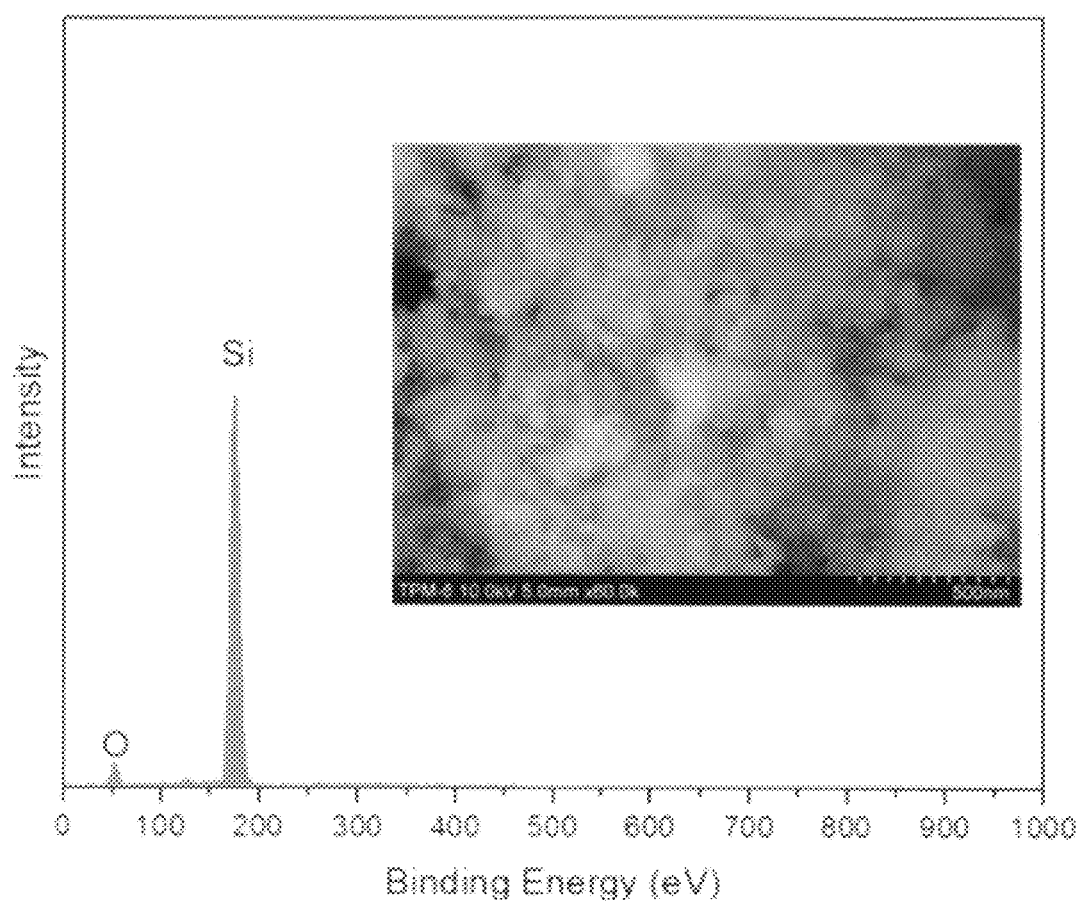
FIG. 6 Selected EDS spectra of the as-prepared nano silicon powders.

A certain amount of the dried TPM particles was put into a muffle furnace and calcined at 400° C.~600° C. for 2 hours under an air purging condition to remove the carbon content from the nanocomposite, yielding yellow-colored silicon nano powders. As shown in FIG. 6, a very small amount of oxygen was drawn into the furnace to slightly oxidize Si nano particles. Normally, the as prepared nano particle has a SSA value in the range of 50~80 $m^2/g$.

Example 3

Graphene-doped Nano Silicon from Nano Silica

In a typical process, 10 wt. % nano silica emulsion is prepared and ultrasonicated at an ultrasonic energy level of 85W (Branson S450 ultrasonicator) for 30 minutes. This is followed by gradually adding 0.2 wt % N002-PS (GO solution) to the silica suspension under constant stirring. The silica to graphene weight ratio is controlled to be 100:1. Because of the polar nature of the nano particles, silica particlescan be readily attached onto the graphene sheet and precipitated out after sedimentation. Then, the supernatant is poured out and the precipitates are filtrated to form a mass of paste. The paste is then dried at 120° C. and the resulting nano composite is mixed with Mg powder to activate the chemical reduction process. The prepared nano particles have a SSA value range of 30 $m^2/g$ to 200 $m^2/g$ for different graphene contents and different sizes of the silica starting material.

Example 4

Graphene-doped Nano Silicon from Sodium Metasilicate

Typical procedures: dilute sodium meta-silicate powders into DI water in a plastic bottle and stir the solution. Dilute N002-PS to a concentration of 0.2 wt. %. Add 1M HCl to the sodium metasilicate solution to adjust the pH value to pH=4 and add surfactant to the solution, followed by aging for 12 hours at 80° C. to form a silica sol. Gradually add the diluted GO solution to the silica sol and keep stirring for 1 hour. After sedimentation of the suspension, silica nano particles are attached onto the graphene sheets and precipitated to the bottom of the bottle. After filtration, rinse the surfactant and dry the paste. The nano composite powders are heated for calcination at 650° C. under an inert gas purging condition to remove the surfactant residue. After grinding the resulting black powders, mix the powders with Mg powder at a desired ratio sufficient for completing the reduction, and ball mill the mixture. The subsequent procedures are the same as described in example 1.

Example 5

Fabrication of Silicon Nano Wires With/Without Graphene

As described in example 1, after sol formation and before addition of ammonia water, add a certain ratio (one in twentieth~one in tenth of the final silicon mass) of nano nickel powder (<100 nm) into the sol and then ultrasonicate the resulting suspension. Then, add ammonia wate into the suspension to form a chocolate color gel. The subsequent procedures are similar to those described in example 1 till the final nano silicon is collected. Then, a certain amount of the nickel and graphene-doped silicon nano composite is placed in the center of a tube furnace. Pump the furnace to vacuum and purge with a mixture of $Ar/H_2$, repeat the step for three times. Then, heat the furnace to 550° C. at a rate of 5° C./min. Keep the temperature at 550° C. for 30 min and then heat the furnace to 950° C. at 5° C./min. Keep the temperature at 950° C. for 2 hours while purging $Ar/H_2$. This is followed by cooling the sample in the furnace and collecting the yellow powders.

We have conducted an extensive and in-depth study on a new class of nano materials called graphene-doped Si nano powders. The following is a summary of some of the more significant observations or conclusions:

(1) A facile and cost-effective method of mass-producing silicon nano powder and graphene-doped silicon nano powder has been developed. The Si nano materials doped with graphene provide the best performance in terms of maintaining a high capacity for a long cycle life as compared to all the anode active material for lithium-ion batteries.

(2) The resulting nano-sized silicon has a size typically in the range of 2 nm-50 nm (more often in the range of 5-40 nm, and most often 10-20 nm). These are highly desired particle size ranges for use as an anode active material, imparting a lithium-ion battery with an exceptionally high specific capacity and a stable and long battery life. As compared to the anode containing Si nano particles in the size range of 20-50 nm and the range of 50-100 nm, the anode featuring Si nano particles of 10-20 nm provide the best ability to maintain the design capacity. For instance, given the same 100 battery charge-discharge cycles, the battery featuring Si powder 10-20 nm in size experiences less than 1% in capacity decay, the 20-50 nm Si based battery suffers a 2.3% capacity decay, and the 50-100 nm Si based battery suffers a 4.8% capacity decay. In further contrast, a corresponding lithium-ion battery featuring a 100-300 nm Si anode materials exhibits a capacity decay of >15% after 100 cycles.

(3) We have further observed that the presence of a graphene material during the Si nano particle production process has significantly reduced the sizes of the final Si nano particles, hence imparting a better battery performance. Pure nano silicon powders can be obtained by heat treating the graphene-doped nano Si powders to remove graphene in the temperature range of 400~800° C.

(4) To achieve the goal of a high Si nano powder production yield and low energy consumption, we have surprisingly found that pristine graphene is the best choice and graphene oxide (GO) the worst co-reactant used in the reduction of Si precursor. The following summarizes the order of preference: pristine graphene>boron-doped graphene>nitrogen-doped graphene>amine-functionalized graphene>graphene fluoride>graphene chloride >graphene bromide>graphene iodide>reduced graphene oxide (RGO)>graphene oxide (GO).

(5) In terms of Si nano powder production yield and energy consumption, the following is an order of preference for selecting a Si precursor material: sodium silicate>SiO>tetraethyl orthosilicate (TEOS)>silica $(SiO_2)$>$SiF_4$>$SiCl_4$>$SiBr_4$>$SiI_4$.

We claim:

1. A method of producing graphene-doped silicon nano powder having a silicon particle size smaller than 100 nm, said method comprising: (a) mixing a graphene material with a silicon precursor to form a silicon precursor/graphene nano composite, wherein said graphene material is selected from pristine graphene, graphene fluoride, graphene bromide, graphene iodide, chemically functionalized graphene, or a combination thereof, wherein pristine graphene is a non-oxidized graphene that is produced without chemical intercalation or oxidation; (b) mixing the silicon precursor/graphene nano composite with a quantity of magnesium; (c) converting said silicon precursor/graphene nano composite to form a mixture of graphene-doped silicon and a reaction by-product by a chemical or thermal reduction reaction; and (d) removing the reaction by-product from the mixture to obtain said graphene-doped silicon nano powder.

2. The method of claim 1, wherein said graphene material is selected from a single-layer sheet or few-layer platelet of pristine graphene, graphene fluoride, graphene bromide, graphene iodide, chemically functionalized graphene, or a combination thereof, wherein few layer is defined as less than 10 layers of graphene planes.

3. The method of claim 1, wherein said silicon precursor contains tetraethyl orthosilicate (TEOS), sodium silicate, silica, silicon-halogen compound, or a combination thereof, and said reaction by-product contains MgO or a magnesium-halogen compound.

4. The method of claim 1, wherein said silicon precursor contains silicon fluoride and said reaction by-product contains $MgF_2$.

5. The method of claim 1, wherein said step (a) of preparing a silicon precursor/graphene nano composite includes dispersing or dissolving a silicon precursor in an acidic graphene solution to form a hybrid suspension, removing a liquid component from said hybrid suspension, and/or chemically or thermally converting said hybrid suspension to form said silicon precursor/graphene nano composite.

6. The method of claim 1, wherein said step (a) of preparing a silicon precursor/graphene nano composite includes nucleation and growth of silicon precursor particles on a graphene surface.

7. The method of claim 1, wherein said step (b) of mixing the silicon precursor/graphene nano composite with a quantity of magnesium includes liquid solution mixing, melt mixing, grinding, mechanical milling, air milling, or ball-milling.

8. The method of claim 1, wherein the step (d) of removing the reaction by-product from the mixture comprises etching the reaction product by an acid solution.

9. The method of claim 8 wherein etching of said reaction by-product includes etching MgO in an acid-resistant container that is equipped with a mechanical stirring system.

10. The method of claim 8 wherein etching of said reaction by-product includes using an acid selected from HCl, $H_2SO_4$, HF, $HNO_3$, or a combination thereof.

11. The method of claim 1, further comprising filtration, washing, and/or drying after step (d).

12. The method of claim 11 wherein the drying process is selected from oven drying, vacuum drying, vaporizing, spray drying, or fluidized bed drying.

13. The method of claim 1 further comprising a heating process to purify the graphene-doped silicon nano powder or to remove graphene for forming pure silicon nano powder.

14. The method of claim 13, wherein the removal of graphene is conducted in a rotating furnace or a fluidized bed furnace.

15. A method of producing graphene-doped silicon nano powder having a silicon particle size smaller than 100 nm, said method comprising: (a) mixing a graphene material with a silicon precursor to form a silicon precursor/graphene nano composite; (b) mixing the silicon precursor/graphene nano composite with a quantity of magnesium; (c) converting said silicon precursor/graphene nano composite to form a mixture of graphene-doped silicon and a reaction by-product by a chemical or thermal reduction reaction; and (d) removing the reaction by-product from the mixture to obtain said graphene-doped silicon nano powder, wherein said step (a) of preparing a silicon precursor/graphene nano composite includes (i) dispersing or dissolving a silicon precursor in an acidic graphene solution to form a hybrid suspension, (ii) adding an alkaline chemical to said hybrid suspension to form a gel, and (iii) drying the gel to form said silicon precursor/graphene nano composite.

16. The method of claim 15, wherein the alkaline chemical is selected from ammonia water, sodium hydroxide solution, potassium hydroxide solution, lithium hydroxide solution, or a combination thereof.

17. The method of claim 15 wherein the step of drying includes spray drying or fluidized bed drying.

18. The method of claim 17 wherein said chamber contains a thermally stable material selected from a stainless steel, a nickel alloy, a titanium alloy, a cobalt alloy, a superalloy, or a high-temperature or refractory alloy that does not react with magnesium at a high temperature in the range of from 500° C. to 1000° C.

19. A method of producing graphene-doped silicon nano powder having a silicon particle size smaller than 100 nm, said method comprising: (a) mixing a graphene material with a silicon precursor to form a silicon precursor/graphene nano composite; (b) mixing the silicon precursor/graphene nano composite with a quantity of magnesium; (c) converting said silicon precursor/graphene nano composite to form a mixture of graphene-doped silicon and a reaction by-product by a chemical or thermal reduction reaction; and (d) removing the reaction by-product from the mixture to obtain said graphene-doped silicon nano powder, wherein said step (b) of mixing the silicon precursor/graphene nano composite with a quantity of magnesium includes coating the silicon precursor with magnesium to form magnesium-coated silicon precursor/graphene nano composite powder.

20. The method of claim 19 wherein said graphene material is selected from pristine graphene, graphene oxide, reduced graphene oxide, graphene fluoride, graphene bromide, graphene iodide, boron-doped graphene, nitrogen-doped graphene, chemically functionalized graphene, or a combination thereof.

21. The method of claim 19, wherein said step (c) of converting said silicon precursor includes placing the magnesium-coated silicon precursor/graphene nano composite powder in a sealed chamber and purging the powder to a heating apparatus that allows the reaction between magnesium and silicon precursor to occur therein for forming a mixture of graphene-doped silicon and a reaction by-product.

22. The method of claim 19, wherein said silicon precursor contains $SiO_2$.

23. The method of claim 19 wherein said heating apparatus comprises a holding chamber or a temporary holding chamber, a pulsed purging control system, a vacuum system, insulating materials, a heating element, a vacuum chamber, and a cooling system.

* * * * *